(12) United States Patent
Neugart

(10) Patent No.: US 11,366,299 B2
(45) Date of Patent: Jun. 21, 2022

(54) METHOD AND LIGHTING ARRANGEMENT FOR ILLUMINATING A SAMPLE LAYER WITH A LIGHT SHEET

(71) Applicant: LEICA MICROSYSTEMS CMS GMBH, Wetzlar (DE)

(72) Inventor: Felix Neugart, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 958 days.

(21) Appl. No.: 15/766,373

(22) PCT Filed: Oct. 10, 2016

(86) PCT No.: PCT/EP2016/074178
§ 371 (c)(1),
(2) Date: Aug. 22, 2018

(87) PCT Pub. No.: WO2017/060520
PCT Pub. Date: Apr. 13, 2017

(65) Prior Publication Data
US 2018/0356619 A1    Dec. 13, 2018

(30) Foreign Application Priority Data
Oct. 9, 2015  (LU) .......................................... 92846

(51) Int. Cl.
*G02B 21/00* (2006.01)
*G02B 27/10* (2006.01)
(Continued)

(52) U.S. Cl.
CPC ..... *G02B 21/0032* (2013.01); *G02B 21/0076* (2013.01); *G02B 21/367* (2013.01); *G02B 27/106* (2013.01); *G02B 27/143* (2013.01)

(58) Field of Classification Search
CPC .... G02B 21/06; G02B 21/0076; G02B 21/16; G02B 21/0032; G02B 27/58;
(Continued)

(56) References Cited

U.S. PATENT DOCUMENTS 7,554,725 B2   6/2009  Stelzer et al.
7,796,328 B2   9/2010  Wolleschensky
(Continued)

FOREIGN PATENT DOCUMENTS

DE           10257423 A1   6/2004
DE       102004034957 A1   2/2006
(Continued)

OTHER PUBLICATIONS

Sanjiv Kumar Tiwari et al: "Generation of a Bessel beam of variable spot size", Applied Optics, Optical Society of America, Wahsington, DC; US, vol. 51, No. 17, Jun. 10, 2012 (Jun. 10, 2012), pp. 3718-3725, XP001575748.
(Continued)

*Primary Examiner* — Collin X Beatty
*Assistant Examiner* — Grant A Gagnon
(74) *Attorney, Agent, or Firm* — Leydig, Voit & Mayer, Ltd.

(57) ABSTRACT

A method for illuminating a sample slice uses a light beam or a light sheet during single plane illumination microscopy (SPIM). The light beam or light sheet is deflected by an angle mirror having a first and second reflective surface reflecting a first and second portion of the light beam or light sheet, respectively, whereby the first and second portions of the light beam or light sheet spatially overlap one another after the deflecting. Alternatively, the light beam or light sheet is refracted by a refractive optical component comprising a first and second refractor surface refracting a first portion of the light beam or light sheet, respectively,
(Continued)

whereby the first and second portions of the light beam or light sheet spatially overlap one another after the refracting.

23 Claims, 4 Drawing Sheets

(51) Int. Cl.
*G02B 21/36* (2006.01)
*G02B 27/14* (2006.01)

(58) Field of Classification Search
CPC .... G02B 21/365; G02B 21/367; G02B 21/26; G02B 21/10; G02B 21/008; G02B 21/14; G02B 21/0072; G02B 21/086; G02B 21/002; G02B 21/0024; G02B 21/361; G02B 21/0048; G02B 21/006; G02B 21/0088; G02B 21/0092; G02B 21/08; G02B 21/36; G02B 21/00; G02B 21/0004; G02B 21/0016; G02B 21/0044; G02B 21/0056; G02B 21/025; G02B 21/082; G02B 21/24; G02B 21/0012; G02B 21/0036; G02B 21/004; G02B 21/0064; G02B 21/02; G02B 21/084; G02B 21/088; G02B 21/18; G02B 21/22; G02B 21/32; G02B 21/34; G02B 2207/113; G02B 26/0833; G02B 27/0068; G02B 19/0028; G02B 21/0008; G02B 21/0068; G02B 21/125; G02B 21/248; G02B 21/362; G02B 2207/114; G02B 26/0816; G02B 27/1006; G02B 5/3083; G02B 7/14; G02B 13/0095; G02B 15/142; G02B 15/144109; G02B 15/163; G02B 17/0896; G02B 19/0066; G02B 19/0076; G02B 19/008; G02B 19/0085; G02B 19/0095; G02B 1/02; G02B 21/0028; G02B 21/0096; G02B 21/12; G02B 21/241; G02B 21/33; G02B 21/364; G02B 23/2438; G02B 26/02; G02B 26/06; G02B 26/105; G02B 27/0025; G02B 27/0031; G02B 27/0075; G02B 27/0081; G02B 27/0911; G02B 27/0927; G02B 27/10; G02B 27/1013; G02B 27/106; G02B 27/126; G02B 27/141; G02B 27/145; G02B 27/283; G02B 27/30; G02B 27/425; G02B 27/4261; G02B 27/56; G02B 27/60; G02B 5/005; G02B 5/0278; G02B 5/04; G02B 5/09; G02B 5/1814; G02B 5/20; G02B 5/288; G02B 5/3016; G02B 6/06; G02B 6/065; G02B 6/4206; G02B 7/003; G02B 7/09; G02B 7/16; G02B 7/28
USPC .......................................... 359/385
See application file for complete search history.

(56) References Cited

U.S. PATENT DOCUMENTS

| 8,238,042 B2 | 8/2012 | Dewitt et al. | |
| 2014/0099659 A1* | 4/2014 | Keller | G02B 21/06 435/29 |

FOREIGN PATENT DOCUMENTS

| DE | 202011110077 U1 | 11/2012 |
| DE | 102012109577 A1 | 5/2013 |

OTHER PUBLICATIONS

Satya Ram Mishra et al: "Generation of hollow conic beams using a metal axicon mirror", Optical Engineering, vol. 46, No. 8, Aug. 8, 2007 (Aug. 2007), pp. 084002, XP055022333.

Keller P J et al: "The zebrafish digital embryo: in tot reconstruction of zebrafish early embryonic evelopment with digital scanned laser light sheet fluorescence microscopy", SPIE, PO Box 10 Bellingham WA 98227-0010 USA, Jun. 14, 2009 (Jun. 14, 2009), XP040498058.

Florian O. Fahrbach, et al., "A line scanned light-sheet microscope with phase shaped self-reconstructing beams", Optics Express, vol. 18, No. 23, Nov. 4, 2010, pp. 1-16.

* cited by examiner

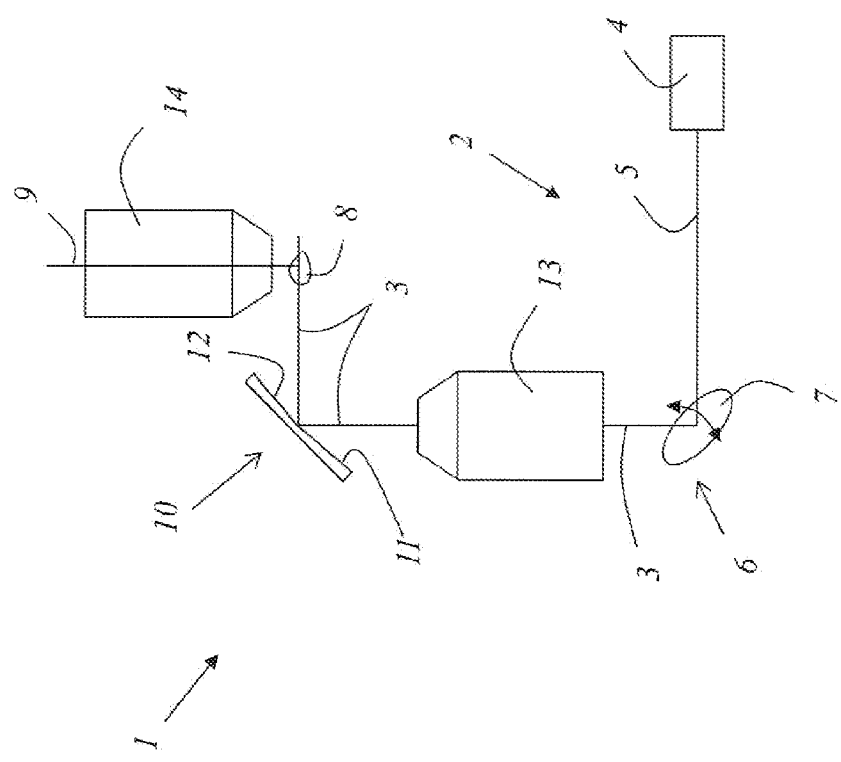

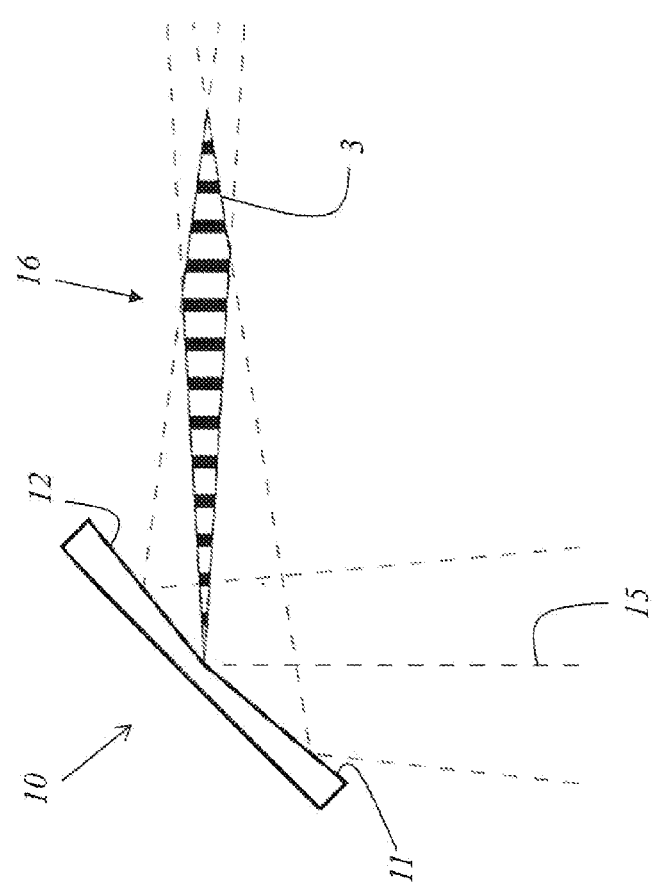

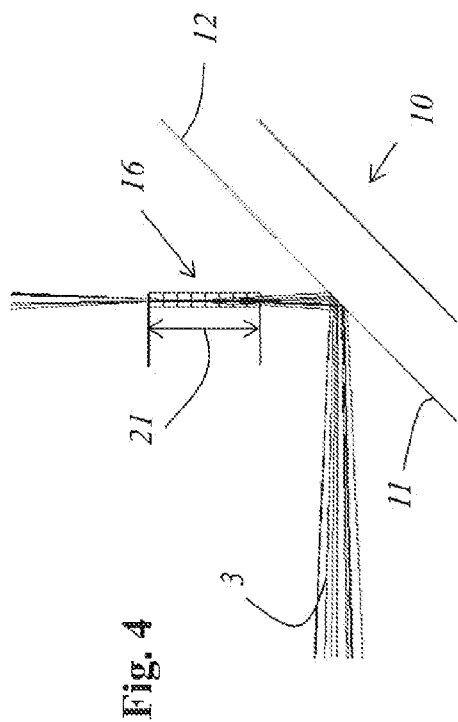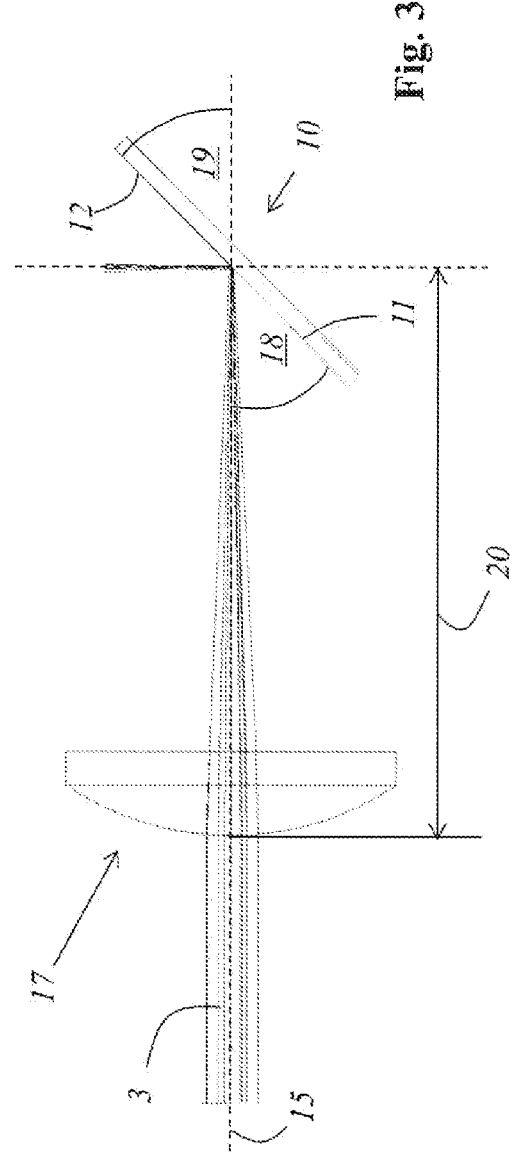

METHOD AND LIGHTING ARRANGEMENT FOR ILLUMINATING A SAMPLE LAYER WITH A LIGHT SHEET

CROSS-REFERENCE TO PRIOR APPLICATIONS

This application is a U.S. National Stage Application under 35 U.S.C. § 371 of International Application No. PCT/EP2016/074178 filed on Oct. 10, 2016, and claims benefit to Luxembourgian Patent Application No. LU 92846 filed on Oct. 9, 2015. The International Application was published in German on Apr. 13, 2017 as WO 2017/060520 under PCT Article 21(2).

FIELD

The invention relates to a method for illuminating a sample slice using a light sheet, which propagates along a light sheet plane, during SPIM microscopy, and to a method for examining a sample, in which a slice of a sample is illuminated using such a method.

The invention also relates to an illumination arrangement for an SPIM microscope, which comprises a light sheet generation device that generates a light sheet, and to a microscope comprising such an illumination arrangement.

BACKGROUND

The SPIM (single plane illumination microscopy) technique, in which a sample is illuminated in layers, allows image data to be detected more quickly and in a gentler manner for the sample than scanning a sample at specific points, for example. A known field of uses of SPIM technology is the field of fluorescence microscopy, in which fluorophores are excited in the sample by means of laser light. The known SPIM technology involves fluorophores being excited in a sample slice that is illuminated by an illumination light sheet (also referred to as a "light strip"). In order to generate an SPIM image, the light sheet is shone through the sample while the sample slice illuminated in this way is observed in the direction perpendicular thereto by detecting the fluorescent light and/or scattered light. A three-dimensional representation of the sample can be generated from the successively captured images of different sample slices, in particular from a stack of images of parallel sample slices.

A microscope that operates using the SPIM method is described in DE 102 57 423 A1. In this microscope, a sample is illuminated by a thin light strip, whilst being observed from a direction perpendicular to the plane of the illuminating light strip. The illumination and the detection take place over two separate optical beam paths each having a separate optical system, in particular using two separate objectives that are perpendicular to one another. The light strip is generated by an illumination objective and a cylindrical optical system arranged upstream of said illumination objective. To take the image, the sample is moved through the light strip, which is stationary in relation to the detector, in order to record fluorescent light and/or scattered light in layers using a two-dimensional detector. The layered image data thus obtained can then be compiled to form a 3D dataset.

DE 10 2004 034 957 A1 discloses an arrangement for microscopically observing a sample using a microscope objective, in the housing of which additional light guides for the illumination light are provided outside the lens optics. The illumination light first runs in parallel with the optical axis of the objective inside the light guides in this case, and then impinges on an annular reflector that is attached to the objective housing and comprises a small aperture, which, by means of additional imaging elements, focuses the illumination light into the sample perpendicularly to the optical axis of the microscope objective and therefore perpendicularly to the observation direction. In this case, too, the sample is illuminated in layers according to the SPIM principle. This microscope is particularly problematic in that the sample has to be positioned spatially inside the annular reflector each time.

DE 20 2011 110 077 U1 also discloses an arrangement for illuminating a sample during SPIM microscopy. The arrangement contains a light source for generating a light beam, means for generating a light strip from the light beam, and at least one objective, which comprises an optical system that is designed and intended for directly or indirectly feeding detection light, which emanates from the sample, to a detector. In addition, the arrangement contains a deflection apparatus, which is arranged downstream of the optical system of the objective, for deflecting the light strip.

DE 10 2012 109 577 A1 discloses an arrangement for use when illuminating a sample during SPIM microscopy. The arrangement comprises an illumination objective, which receives and focuses a light strip or a quasi-light strip. The arrangement is characterized in that a deflection means is provided, which deflects the light strip or the quasi-light strip after it has passed through the illumination objective such that it propagates at an angle to the optical axis of the illumination objective that is not zero degrees, in particular at a right angle, the illumination objective and the deflection device being arranged such that they can move relative to one another.

In the scientific publication by F. O. Fahrbach, A. Rohrbach, "A line scanned light-sheet microscope with phase shaped self-reconstructing beams", Optics Express, vol. 18, no. 23, November 2010, pages 24229-24244, an SPIM microscope is described, in which the sample is illuminated using a self-healing illumination light beam. This article mentions the fact that, in order to generate such illumination light beams, an axicon can be used; this having proven disadvantageous, however. In fact, in practice the use of an axicon is adversely associated with the need for a large amount of space and with being highly complex to adjust. Instead of using an axicon, the above-mentioned scientific publication proposes a holographic generation using a spatial light modulator. However, such an arrangement is disadvantageous in that it is highly complex in terms of equipment, is expensive to produce and is prone to failure.

SUMMARY

In an embodiment, the present invention provides a method for illuminating a sample slice using a light beam or a light sheet during single plane illumination microscopy (SPIM). The light beam or light sheet is deflected by an angle mirror having at least a first and a second reflective surface, the first reflective surface reflecting a first portion of the light beam or light sheet and the second reflective surface reflecting a second portion of the light beam or light sheet, whereby the first portion of the light beam or light sheet and the second portion of the light beam or light sheet spatially overlap one another after the deflecting. Alternatively, the light beam or light sheet is refracted by a refractive optical component comprising at least a first and a second refractor surface, the first refractor surface refracting a first portion of the light beam or light sheet and the second refractor surface refracting a second portion of the light beam light sheet, whereby the first portion of the light beam or light sheet and the second portion of the light beam or light sheet spatially overlap one another after the refracting.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a schematic detailed view of a microscope, comprising an embodiment of an illumination arrangement according to the invention, FIG. 2 is a detailed view illustrating the operating principle of the angle mirror, FIG. 3 shows a quantitative example of the generation of a light sheet having properties that are similar to those of a Bessel beam, FIG. 4 is a detail from FIG. 3.

DETAILED DESCRIPTION

Figure 5:
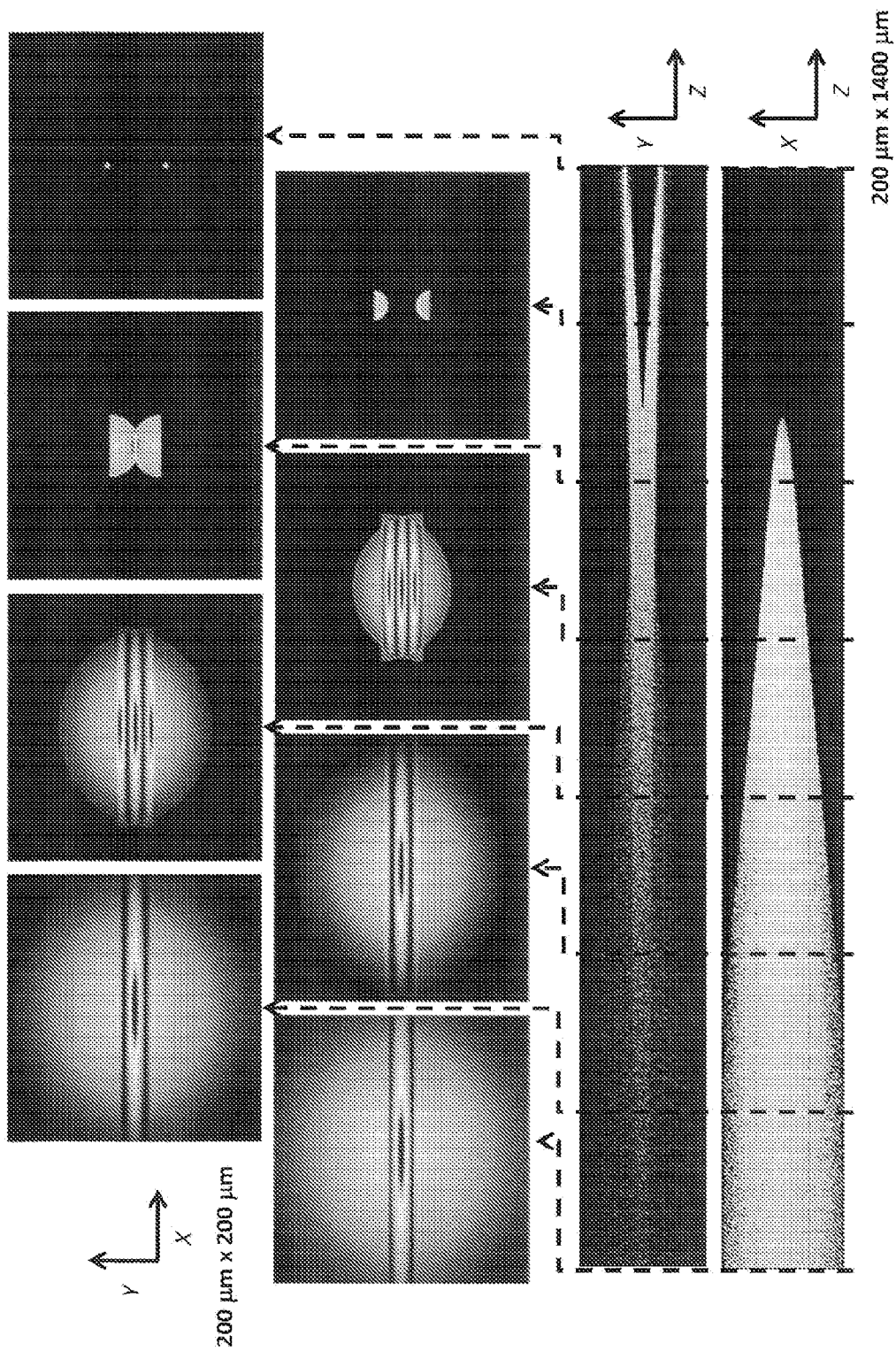
FIG. 5 shows sectional views through the interference region of the light sheet with regard to the example shown in FIG. 4.

In an embodiment, the present invention provides a method for SPIM microscopy for improved illumination of a sample slice, which method is simple and less complex to carry out.

According to an embodiment, the method is characterized in that a light beam or light sheet is deflected by means of an angle mirror having at least a first and a second reflective surface, the first reflective surface reflecting a first portion of the light beam/light sheet and the second reflective surface reflecting a second portion of the light beam/light sheet, and the first portion of the light beam/light sheet and the second portion of the light beam/light sheet spatially overlapping after they have been deflected, and a beam having an interference pattern is thereby formed when coherent light is used, of which one or more maxima can be used as light sheets. This approach can therefore be used to generate a light sheet from a light beam or to optimize and/or shape a light sheet that has already been generated upstream of the angle mirror by means of a light sheet generation device (which contains a cylindrical optical system or a beam-deflecting apparatus for generating the light sheet, for example).

Another embodiment of the present invention provides an illumination arrangement for improved illumination during SPIM microscopy, which arrangement is easy to produce and is less prone to failure.

According to an embodiment, the illumination arrangement is characterized in that it contains an angle mirror having at least a first and a second reflective surface, which angle mirror deflects the light beam/light sheet, the first reflective surface reflecting a first portion of the light beam/light sheet and the second reflective surface reflecting a second portion of the light beam/light sheet, and the first portion of the light beam/light sheet and the second portion of the light beam/light sheet spatially overlapping after they have been deflected, and a beam having an interference pattern is thereby produced when coherent light is used, of which the maxima can be used as light sheets. In the event that a light sheet is shone onto the angle mirror, the associated light sheet generation device is arranged upstream of the angle mirror.

The resultant beam comprising an interference pattern corresponds to a Bessel-like beam (i.e. a beam that is similar to a Bessel beam) and can in particular also be used in an advantageous manner due to its self-healing properties when illuminating a microscopic sample during SPIM microscopy. This is not a Bessel beam or a Bessel-Gaussian beam, as is generated by means of an axicon, since the beam is not rotationally symmetrical. Instead, it only comprises a two-dimensional symmetrical shape.

According to an embodiment of the invention, it has therefore been found that, by using an angle mirror, different components of a beam or light sheet can be caused to overlap in a simple manner such that, due to the Bessel-like properties of the resultant beam, the sample slice can be illuminated more homogeneously and the sample can be penetrated to a greater depth. Lastly, this provides a better resolution and an improved result with regard to imaging the sample slice to be examined and acquiring image data relating thereto. This is irrespective of whether the light sheet has been shaped by means of a cylindrical optical system or by means of a beam-deflecting apparatus by being quickly moved back and forth, as is explained in detail below.

An embodiment of the invention also offers the additional advantage that no superstructures are required that require a lot of installation space. Instead, the illumination arrangement according to the invention can be designed so as to require a minimum amount of space. It can therefore advantageously be integrated in different microscope systems in a simple and straightforward manner.

Within the context of this application, a light sheet is understood to mean a beam, the cross section of which has a height that is much smaller than its width. Reference is made in the following to the fact that the light sheet propagates along a light sheet plane. The term "light sheet plane" means the plane of symmetry of the light sheet, which is defined on the one hand by the propagation direction and on the other hand by the direction of the width extension of the light sheet. In a quasi-light sheet, a primary light beam, generated by a laser for example, is moved quickly back and forth in said light sheet plane, which is explained in detail below.

The region of the interference pattern (interference region) is the region that can preferably be used for examining the sample (useful region). Different measurement variants allow the sample to be placed in different positions in this case, since the number of maxima of the interference pattern is typically dependent on the position along the light beam or the light sheet plane. Depending on the desired type of examination, a sample can be placed in different positions along the interference region so that it is illuminated by the desired number of interference maxima. The planes that correspond to the interference maxima can be separately focused on a detector by a suitable optical system (for example by a suitable lens array or a suitable lens arrangement). This allows different planes of the sample to be recorded at the same time.

In a particular embodiment, which in particular also allows a Bessel-like beam to be generated, the line of contact between the first and the second reflective surface of the angle mirror is arranged in the light sheet plane. This ensures that the light components of the light sheet, which are caused to overlap after they have been reflected, are the same size. Alternatively or in addition, the portion of the light sheet impinging on the first reflective surface and the portion of the light sheet impinging on the second reflective surface can also run on different sides of the light sheet plane immediately before they impinge on the angle mirror.

In a particular embodiment, the light beam or light sheet is guided through an illumination objective before it impinges on the angle mirror. In such an embodiment, the angle mirror can advantageously be used not only to provide portions of the light beam/light sheet with specific properties, but also to deflect the light beam/light sheet after it has passed through the illumination objective such that it runs at an angle to the optical axis of a detection objective that is not zero degrees, in particular perpendicularly to the optical axis of a detection objective, it being possible for the optical axis of the detection objective to be arranged coaxially or at least in parallel with that of the illumination objective. This very advantageously allows for a very compact structure and in particular also a structure that corresponds to the classical structure of a microscope, in which an illumination objective (condenser) and a detection objective are opposite one another. This results in the additional advantage that components that have already been developed for other microscopes, in particular microscope stands, can be used to construct corresponding SPIM microscopes, or that existing microscopes can be easily upgraded or retrofitted.

It is also particularly advantageous to orient the light sheet plane perpendicularly to the optical axis of the detection objective since the sample slice is illuminated in such a way that the light paths of the detection light are at least substantially equal up until said light leaves the sample.

The angle mirror can be fastened to the illumination objective or to the detection objective, for example, in particular so as to be movably guided. Such a structure is particularly compact and robust and mostly operates without an additional stand.

The light sheet can be formed from a primary light beam, in particular a laser light beam, for example by means of a cylindrical optical system, which can in particular contain a cylindrical lens or a cylindrical mirror.

Alternatively, however, a quasi-light sheet can also be generated by oscillating a light beam back and forth in the light sheet plane, in particular a light beam having a circular cross section, other cross-sectional shapes also being possible, such as elliptical or rectangular cross sections. For example, a light beam, which has a round cross section, can first be generated, for example using a laser light source, which a beam-deflecting apparatus that is adjustable with regard to its angle of deflection and can be the scanner of a scanning microscope in particular, moves quickly back and forth such that a quasi-light sheet is formed as a result (the scanner is part of the light sheet generation device). In particular, the light beam can be moved quickly back and forth such that the detector that receives the detection light at least substantially generates the same detection signals as those produced when using a light sheet, which has been shaped by a cylindrical optical system, to illuminate the sample, and/or such that the detector used cannot differentiate the quasi-light sheet from a light sheet generated by a cylindrical optical system, for example.

In general and irrespective of the use of a light sheet generation device, in addition to the circular shape, any other shapes can be formed for the cross section of the light beam (such as rectangular, elliptical or trapezoidal cross-sectional shapes), for example by suitable diaphragms, which are introduced into the beam path of the light beam and thus influence the cross-sectional shape of the light beam. As a result of other cross-sectional shapes, the amount of light that is outside the interference maxima used (for illumination or detection purposes) can be reduced in comparison with the use of a circular light beam, i.e. preferably only the portion of the original light beam that is required for generating the interference maxima that is ultimately used is used to generate the interference pattern. This approach allows for a better image quality in comparison with the use of a circular light beam, since it shields or minimizes disturbing light emanating from outside the focus ("out-of-focus light") during the detection.

In a simple embodiment, the reflective surfaces of the angle mirror are flat.

However, it is also possible for the reflective surfaces to be curved or for the reflective surfaces to be formed as surfaces of a cylindrical portion, in particular having cylinder axes that are parallel to one another, for example in order to additionally focus or defocus each component of the light sheet separately. For example, the foci of the light sheet components that are reflected by the different reflective surfaces can therefore be offset with respect to one another in the region where they overlap one another.

It has been found that the resultant light sheet comprises particularly advantageous illumination properties when the first and the second reflective surface are at an angle to one another that is in the range of from 175.0 degrees to 179.999 degrees, in particular in the range of from 178.0 degrees to 179.99 degrees, in particular in the range of from 179.0 to 179.95 degrees, in particular in the range of from 179.1 to 179.9 degrees, in particular in the range of from 179.3 degrees to 179.7 degrees, in particular 179.5 degrees. If the reflective surfaces are curved, these stated angles can relate at least to the contact region between the reflective surfaces or to the tangential surfaces of the reflective surfaces in the contact region.

An angle mirror that comprises precisely two reflective surfaces, in particular precisely two flat reflective surfaces, is particularly simple to produce and still provides the above-described advantages. However, it is possible, in particular for specific applications, for the light sheet to be divided not only into two components, which are caused to overlap, but into a larger number of components. For this purpose, the angle mirror can comprise at least one additional reflective surface, which reflects a portion of the light sheet that, after being deflected, interferes with the portions of the light sheet that are reflected by the first and the second reflective surface.

The angle mirror can in particular be integrally formed from a single piece of starting material. For example, the angle mirror can be made of a piece of stainless steel. Alternatively, it is also possible to assemble the angle mirror from a plurality of individual parts, in particular a plurality of individual mirrors.

The reflective surfaces can be polished metal surfaces, for example, in particular stainless steel surfaces. It is also possible for the angle mirror to be formed from a substrate on which the reflective layers are vapor-deposited.

It is also possible for the angle mirror to be formed on the boundary surfaces of a transparent solid body, with the light sheet being coupled into said body and coupled out again after being deflected. The boundary surfaces can be provided with a reflective coating for this purpose. Alternatively, it is also possible for the deflection at the angle mirror to relate to total reflection.

An angle mirror made of stainless steel, in particular of stainless steel as used in medical technology, is particularly advantageous in that it is inert to the material in which microscopic samples to be visually examined are usually embedded. This is advantageous in that such an angle mirror can be readily immersed in the embedding medium in the container, in which the sample to be examined is located.

A microscope equipped with an illumination arrangement according to the invention is particularly advantageous. This is because such a microscope in particular makes it possible to achieve better imaging results, in particular due to the sample slice being illuminated more homogeneously and to the sample being penetrated to a greater depth.

Such a microscope can advantageously contain a scanning microscope or a confocal scanning microscope and/or can be formed from a scanning microscope and/or a confocal scanning microscope. In this case, in particular the beam-deflecting apparatus of the scanning microscope or the confocal scanning microscope, which apparatus can be adjusted in terms of its angle of deflection, can be used to generate a quasi-light sheet, as is described above.

Instead of the angle mirror, i.e. a reflective component that deflects the light sheet, a refractive optical component comprising at least a first and a second refractor surface can also be used in an equivalent manner, the first refractor surface refracting a first portion of the light sheet and the second refractor surface refracting a second portion of the light sheet, and the first portion of the light sheet and the second portion of the light sheet spatially overlapping one another after they have been refracted. The above statements made with regard to specific embodiments and advantages similarly apply to a refractive optical component of this type.

FIG. 1 is a schematic detailed view of an SPIM microscope, comprising an embodiment of an illumination arrangement 1 according to the invention.

The illumination arrangement 1 comprises a light sheet generation device 2, which generates a light sheet 3. The light sheet generation device 2 comprises a laser 4, which generates a light beam 5 having a round cross section, other cross-sectional shapes also being possible in principle, such as elliptical or rectangular cross sections. In addition, the light sheet generation device 2 comprises a beam-deflecting apparatus 6, which can be adjusted in terms of its angle of deflection and can contain a pivotally suspended hinged mirror 7, for example. The beam-deflecting apparatus 6 moves the light beam 5 back and forth so quickly that it forms a quasi-light sheet. To be specific, the light beam is moved back and forth so quickly that, with regard to the detection signals to be generated, the detector used, which receives the detection light 9 emanating from an illuminated sample 8, cannot distinguish the quasi-light sheet generated from a light sheet generated using a cylindrical optical system, for example.

An illumination objective 13, which focuses the light sheet 3, and an angle mirror 10 are arranged downstream of the light sheet generation device 2. After passing through the illumination objective 13, the light sheet 3 impinges on the angle mirror 10 that comprises a first reflective surface 11 and a second reflective surface 12.

The angle mirror 10 deflects the light sheet 3, the first reflective surface 11 reflecting a first portion of the light sheet 3 and the second reflective surface 12 reflecting a second portion of the light sheet 3, and the first portion of the light sheet 3 and the second portion of the light sheet 3 spatially overlapping and interfering (interference region (16) of the light sheet 3) after having been deflected.

The light sheet 3 shines through the sample 8 and thereby illuminates a sample slice that is perpendicular to the optical axis of a detection objective 14. The detection light 9 emanating from the sample 8 is collimated by the detection objective 14 and then guided to a surface detector.

The light sheet plane of the light sheet 3 impinging on the angle mirror 10 and the light sheet plane of the light sheet 3 deflected by the angle mirror 10 are perpendicular to the plane of the drawing. The line of contact between the first reflective surface 11 and the second reflective surface 12 of the angle mirror 10 extends along the line where the light sheet plane of the light sheet 3 that impinges on the angle mirror 10 and the light sheet plane of the light sheet 3 that is deflected by the angle mirror 10 intersect. With reference to FIG. 1, the line of contact is also perpendicular to the plane of the drawing.

FIG. 2 is a detailed view illustrating the operating principle of the angle mirror 10. The portion of the light sheet 3 that impinges on the first reflective surface 11 and the portion of the light sheet 3 that impinges on the second reflective surface 12 run on different sides of the light sheet plane 15 immediately before they impinge on the angle mirror 10, which plane is perpendicular to the plane of the drawing in FIG. 2. After being deflected, these components interfere such that a light sheet 3 having advantageous properties is formed in the interference region 16, which is similar to the light sheet of a Bessel beam. The interference region 16 of the light sheet 3 is advantageously particularly long compared with the focus of a light sheet having a Gaussian shape, and therefore the sample (8) can be penetrated particularly deeply. In addition, the sample slice is illuminated more homogeneously.

FIGS. 3 and 4 show a quantitative example of the generation of a light sheet 3 having similar properties to the light sheet of a Bessel beam. The light sheet 3 coming from a light generation device, whose light sheet plane 15 is perpendicular to the plane of the drawing, is focused using a plano-convex lens 17 made of borosilicate crown glass (N-BK7) in this example. The radius of curvature of the convex surface is 18.2 mm.

An angle mirror 10 comprising a first reflective surface 11 and a second reflective surface 12 is arranged downstream of the lens 17. The line of contact between the first reflective surface 11 and the second reflective surface 12 lies in the light sheet plane 15. In this embodiment, too, the portion of the light sheet 3 impinging on the first reflective surface 11 and the portion of the light sheet 3 impinging on the second reflective surface 12 run on different sides of the light sheet plane 15 immediately before they impinge on the angle mirror 10, and the two portions of the light sheet 3 interfere after they have been deflected. The distance 20 of the line of contact between the first reflective surface 11 and the second reflective surface 12 from the lens 17 is 34 mm in this example.

The angle 18 between the first reflective surface 11 and the light sheet plane 15 of the incident light sheet 3 is 44.75 degrees. The angle 19 between the second reflective surface 12 and the light sheet plane 15 of the incident light sheet 3 is 45.25 degrees. As a result, the angle between the first reflective surface 11 and the second reflective surface 12 is 179.5 degrees.

The interference region 16 of the light sheet 3 begins approximately 1.1 mm after the angle mirror 10 and ends approximately 2.7 mm after the angle mirror 10, giving an interference region length 21 of approximately 1.6 mm.

FIG. 5 shows sectional views through the interference region 16 of the light sheet 3 with regard to the example shown in FIG. 4. The two bottom views represent sections in the propagation direction of the light sheet 3, specifically an x-z section and a y-z section. In the two top rows, the x-y sections are imaged in different z positions, which are marked by the dashed lines. The interference region 16 is the region that can preferably be used for examining the sample (useful region). Different measurement variants allow the sample to be placed in different positions in this case. Depending on the desired type of examination, a sample can be placed in different positions of the interference region 16. Therefore, the sample can be placed in the interference region 16 such that it is illuminated by two or three interference maxima, for example. The planes that correspond to the interference maxima can be separately focused on a detector by a suitable optical system (for example by a suitable lens array or a suitable lens arrangement). This makes it possible to record different planes of the sample at the same time.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 illumination arrangement
2 light sheet generation device
3 light sheet
4 laser
5 light beam
6 beam-deflecting apparatus
7 hinged mirror
8 sample
9 detection slice
10 angle mirror
11 first reflective surface
12 second reflective surface
13 illumination objective
14 detection objective
15 light sheet plane
16 interference region
17 lens
18 angle
19 angle
20 distance
21 interference region length

The invention claimed is:

1. A method for illuminating a sample slice using a light beam or a light sheet during single plane illumination microscopy (SPIM), the method comprising:
deflecting the light beam or light sheet by an angle mirror having at least a first and a second reflective surface, the first reflective surface reflecting a first portion of the light beam or light sheet and the second reflective surface reflecting a second portion of the light beam or light sheet, whereby the first portion of the light beam or light sheet and the second portion of the light beam or light sheet spatially overlap one another after the deflecting and at the sample slice, wherein the first reflective surface is on a same surface side of the angle mirror as the second reflective surface, or
refracting the light beam or light sheet by a refractive optical component comprising at least a first and a second refractor surface, the first refractor surface refracting a first portion of the light beam or light sheet and the second refractor surface refracting a second portion of the light beam or light sheet, whereby the first portion of the light beam or light sheet and the second portion of the light beam or light sheet spatially overlap one another after the refracting and at the sample slice, wherein the first refractor surface is on a same surface side of the refractive optical component as the second refractor surface.

2. The method as recited in claim 1, wherein the deflecting is performed, and wherein:
a. the light sheet propagates along a light sheet plane and a line of contact between the first and the second reflective surface is arranged in the light sheet plane, and/or
b. the light sheet propagates along a light sheet plane and the first portion of the light sheet that impinges on the first reflective surface and the second portion of the light sheet that impinges on the second reflective surface run on different sides of the light sheet plane immediately before the first and second portions of the light sheet impinge on the angle mirror.

3. The method as recited in claim 1, wherein the deflecting is performed, and wherein the light sheet is guided through an illumination objective before the light sheet impinges on the angle mirror.

4. The method as recited in claim 1, wherein the deflecting is performed, and wherein:
a. the light sheet is generated by a cylindrical optical system, or
b. the light sheet is formed as a quasi-light sheet that is generated by moving a light beam back and forth.

5. The method as recited in claim 1, wherein the deflecting is performed, and wherein:
a. the reflective surfaces are flat,
b. the reflective surfaces are curved,
c. the reflective surfaces are formed as concave cylindrical mirrors,
d. the reflective surfaces are formed as surfaces of a cylindrical portion, or
e. the reflective surfaces are formed as surfaces of a cylindrical portion having cylinder axes that are parallel to one another.

6. The method as recited in claim 1, wherein the deflecting is performed, and wherein:
   a. the first and the second reflective surface are at an angle to one another, at least in a contact region, in a range of from 175.0 degrees to 179.999 degrees, and/or
   b. reflective surfaces that are touching are at an angle to one another, at least in a contact region, in a range of from 175.0 degrees to 179.999 degrees.

7. The method as recited in claim 1, wherein the deflecting is performed, and wherein the angle mirror comprises at least one additional reflective surface that reflects a portion of the light sheet that, after being deflected, interferes with the portions of the light sheet that are reflected by the first and the second reflective surface.

8. The method as recited in claim 1, wherein the refracting is performed.

9. A method for examining a sample comprising examining a slice of the sample which is illuminated using the method as recited in claim 1.

10. The method as recited in claim 9, wherein:
   a. the illumination takes place such that the light sheet that illuminates the slice of the sample is oriented perpendicularly to an optical axis of a detection objective,
   b. the illumination takes place such that the light sheet that illuminates the slice of the sample impinges on the sample at an angle to an optical axis of a detection objective that is not zero degrees, and/or
   c. the light sheet is focused by an illumination objective and detection light emanating from the slice of the sample passes through a detection objective, the optical axes of the illumination objective and of the detection objective being coaxial or parallel to one another.

11. An illumination arrangement for a single plane illumination microscopy (SPIM) microscope, the illumination arrangement comprising:
   a light sheet generation device configured to generate a light sheet, and one of:
      an angle mirror comprising at least a first and a second reflective surface is arranged downstream of the light sheet generation device and configured to deflect the light sheet, the first reflective surface reflecting a first portion of the light sheet and the second reflective surface reflecting a second portion of the light sheet such that the first portion of the light sheet and the second portion of the light sheet spatially overlap one another after being deflected and at a sample slice, wherein the first reflective surface is on a same surface side of the angle mirror as the second reflective surface, or
      a refractive optical component having at least a first and a second refractor surface, the first refractor surface refracting a first portion of the light sheet and the second refractor surface refracting a second portion of the light sheet such that the first portion of the light sheet and the second portion of the light sheet spatially overlap one another after being refracted and at the sample slice, wherein the first refractor surface is on a same surface side of the refractive optical component as the second refractor surface.

12. The illumination arrangement as recited in claim 11, comprising the angle mirror, wherein the illumination arrangement is configured such that:
   a. the light sheet propagates along a light sheet plane and a line of contact between the first and the second reflective surface is arranged in the light sheet plane, and/or
   b. the light sheet propagates along a light sheet plane and the first portion of the light sheet that impinges on the first reflective surface and the portion of the light sheet that impinges on the second reflective surface run on different sides of the light sheet plane immediately before they impinge on the angle mirror.

13. The illumination arrangement as recited in claim 11, comprising the angle mirror, wherein the illumination arrangement comprises an illumination objective through which the light sheet passes before impinging on the angle mirror.

14. The illumination arrangement as recited in claim 11, wherein the light sheet generation device comprises a cylindrical optical system, and/or wherein the light sheet generation device comprises a beam-deflecting apparatus that has an adjustable angle of deflection.

15. The illumination arrangement as recited in claim 11, comprising the angle mirror, wherein:
   a. the reflective surfaces are flat,
   b. the reflective surfaces are curved,
   c. the reflective surfaces are formed as concave cylindrical mirrors,
   d. the reflective surfaces are formed as surfaces of a cylindrical portion, or
   e. the reflective surfaces are formed as surfaces of a cylindrical portion having cylinder axes that are parallel to one another.

16. The illumination arrangement as recited in claim 11, comprising the angle mirror, wherein the angle mirror is made of stainless steel or of medical-grade stainless steel.

17. The illumination arrangement as recited in claim 11, comprising the angle mirror, wherein the angle mirror comprises at least one additional reflective surface configured to deflect a portion of the light sheet that, after being deflected, interferes with the portions of the light sheet that are reflected by the first and the second reflective surface.

18. The illumination arrangement as recited in claim 11, comprising the angle mirror, wherein:
   a. the first and the second reflective surface are at an angle to one another, at least in a contact region, in a range of from 175.0 degrees to 179.999 degrees, and/or
   b. reflective surfaces that are touching are at an angle to one another, at least in a contact region, in a range of from 175.0 degrees to 179.999 degrees.

19. The illumination arrangement as recited in claim 11, comprising the refractive optical component.

20. A microscope comprising the illumination arrangement as recited in claim 11.

21. The microscope as recited in claim 20, wherein:
   a. the illumination arrangement is configured to illuminate a sample such that the light sheet that illuminates a slice of the sample is perpendicular to the optical axis of a detection objective,
   b. the illumination arrangement is configured to illuminate a sample such that the light sheet that illuminates a slice of the sample impinges on the sample at an angle to the optical axis of the detection objective that is not zero degrees, and/or
   c. an illumination objective is configured to focus the light sheet and the illumination arrangement is configured such that detection light emanating from the sample slice passes through a detection objective, the optical axes of the illumination objective and of the detection objective being coaxial or parallel to one another.

22. The microscope as recited in claim 20, wherein the microscope contains a scanning microscope and/or a confocal scanning microscope and/or is formed from a scanning microscope and/or a confocal scanning microscope.

23. A method for single plane illumination microscopy (SPIM), the method comprising:
   providing an angle mirror comprising at least a first and a second reflective surface, wherein the first reflective surface is on a same surface side of the angle mirror as the second reflective surface, or providing a refractive optical component comprising at least a first and a second refractor surface for shaping the focus of a light sheet, wherein the first refractor surface is on a same surface side of the refractive optical component as the second refractor surface, and
   superposing, using the angle mirror or the refractive optical component, different components of a light sheet during the SPIM, and/or generating, using the angle mirror or the refractive optical component, a Bessel-like beam for illuminating a microscopic sample during the SPIM.

* * * * *